Figure 1:
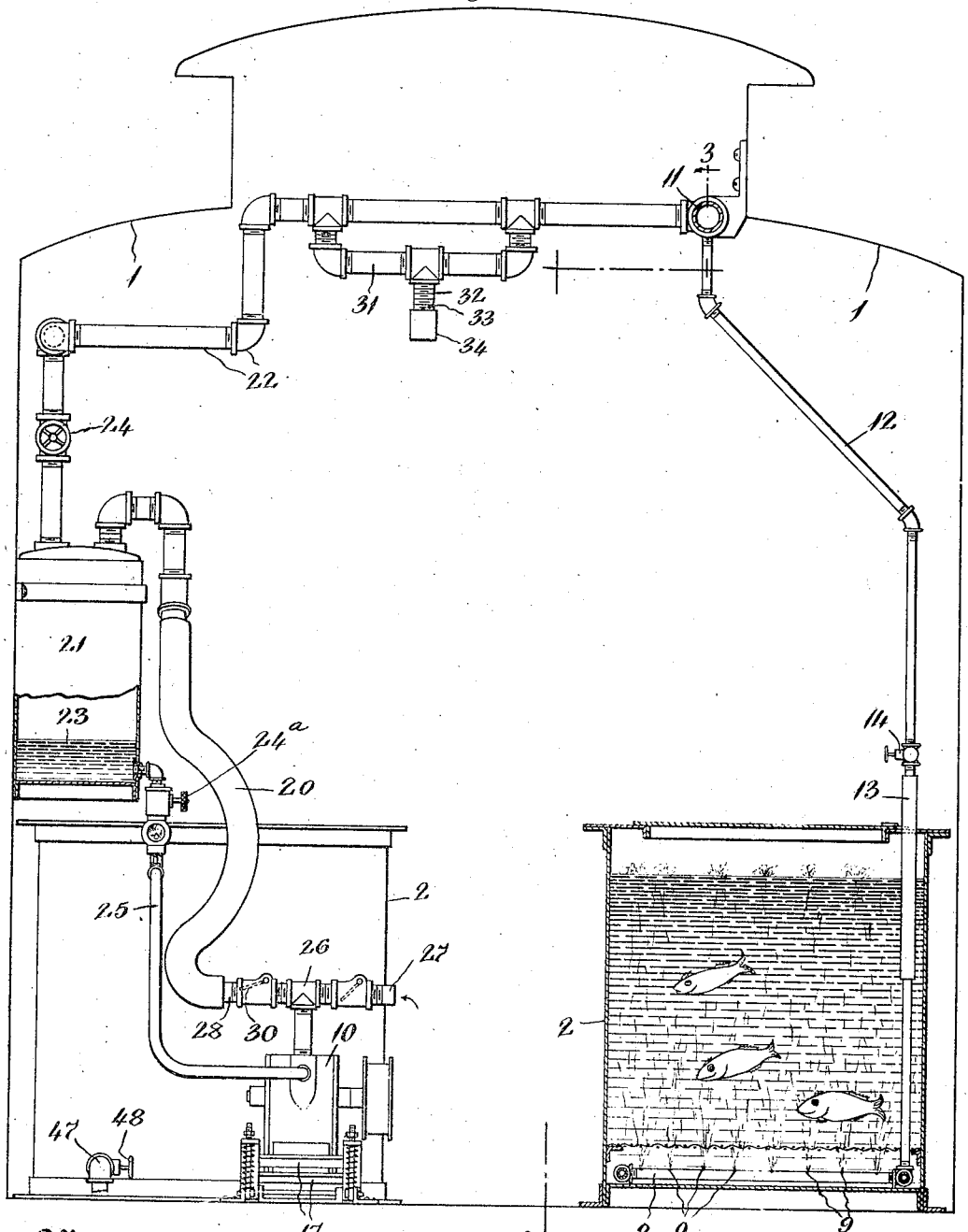

M. WENIG.
FISH CAR.
APPLICATION FILED AUG. 21, 1914.

1,162,422.

Patented Nov. 30, 1915.
2 SHEETS—SHEET 1.

Witnesses:
John J. Kittel
[signature]

Inventor
Max Wenig
By his Attorney
Axel V. Becker

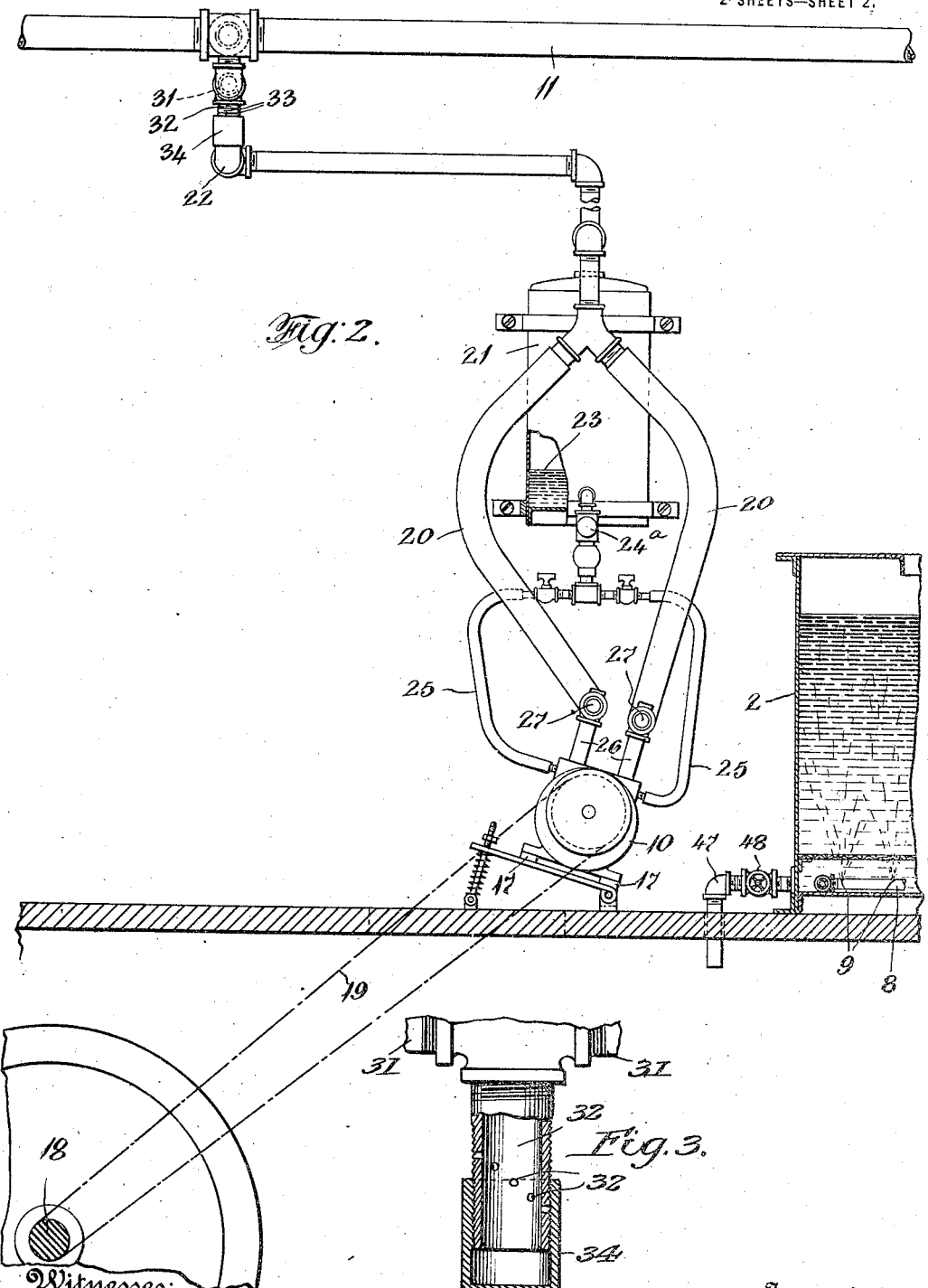

UNITED STATES PATENT OFFICE.

MAX WENIG, OF NEW YORK, N. Y.

FISH-CAR.

1,162,422.  Specification of Letters Patent.  Patented Nov. 30, 1915.

Application filed August 21, 1914. Serial No. 857,960.

*To all whom it may concern:*

Be it known that I, MAX WENIG, a citizen of the United States, and a resident of New York city, in the county of New York and State of New York, have invented certain new and useful Improvements in Fish-Cars, of which the following is a specification.

The present invention relates to devices for containing live fish or the like for a considerable length of time without necessitating the change of the water in which the fish are originally placed.

The invention consists of automatic oiling means for a pump and in means for preventing the oil from entering the water in the tanks with the air from the pump.

With these and other objects in view, the invention consists in the above and other features of construction, combination and arrangement of parts which will appear as the description proceeds, and will be finally pointed out in the appended claim.

The drawing accompanying the specification illustrates the invention in a concrete and preferred embodiment but it is to be understood that the invention is capable of many changes and modifications without departure from the spirit and scope of the invention.

The invention is illustrated in: Figure 1 which is a vertical section taken through the car, and illustrates the air pump which is driven from the running-gear of the car. Fig. 2 is a fragmentary side view taken substantially on line 3—3 of Fig. 1, and shows one of the tanks in section. Fig. 3 is a fragmentary detail view, partly in section, of the pressure regulating means of the system.

Similar and like characters referred to in the following specification denote similar and like parts throughout the drawings.

1 indicates the body of a car, or other vehicle having disposed and suitably arranged thereon the fluid tanks 2. It is to be understood that although the invention is here shown as a car equipment it may be used in connection with boats or fish aquariums, or the like, where it is desired to retain live fish in tanks of water.

A piping 8 formed with a multiplicity of capillary perforations 9 is suitably arranged in each tank 2 below the water level therein and is supplied with air from a suitable air supply 10, which forces the air through the same. This piping 8 is connected to the main supply pipe 11 through the branch pipe 12 and the flexible tube connection 13, which latter immediately connects the branch pipe 12 and the piping 8. Conveniently located in each of the branch pipes 12 is a cut-off valve 14 for shutting off and regulating the flow of air pressure to each respective tank.

A rotary pump 10 is provided for supplying air to the tanks when the car is in motion. This pump 10 may be of any suitable construction and is mounted upon the spring bed 17 and is driven from the running-gear 18 of the car by the belt or chain 19. The pump is connected with the main pipe 11 through the branch tubes 20, the reservoir 21 and the supply pipe 22. Suitably located in the supply pipe 22 is the cut-off valve 24 which governs communication between the pump 10 and the main pipe 11. The reservoir 21 is adapted to contain a low level of oil 23 which is acted upon by the air pressure therein and forced through the needle valve 24ª, branch pipes 25 to the pump, this provides automatic means for oiling the pump. Extending from substantially opposite sides of the rotary motor 10 are T connections 26 which are provided with the inlet ends 27 and the outlet ends 28, the latter having one of the branch tubes 20 connected therewith. Suitably located in the inlet and outlet ends 27 and 28 of the T connections 26 are the check valves 29 and 30 which automatically operate to feed air into one of the branch tubes 20, according to the direction of rotation of the motor. In other words, when the car is traveling in one direction air is drawn in by the pump 10 through one of the inlets 27 of one of the T connections 26 and is forced from the pump through the other T connection on the opposite side of the pump, through the flexible connection 20 to the reservoir 21. When the direction of the car is reversed the check valves 29 and 30 automatically select the inlet and outlet ports of the pump.

When the pump is in motion and air pressure is forced to the reservoir 21 oil is fed to the pump, but since the tubes 20 are connected to the reservoir 21 above the oil level, the oil will drop to the bottom of the reservoir and will not be carried into the water in the tanks. Between the reservoir 21 and the main pipe 11 there is provided the by-pass or trap 31 having a nipple 32 threaded therein and having suitable slots or perforations 33 formed therein. The cap 34 is threaded upon the nipple 32 and is adapted to open and close the perforations 33. It has been found that when the car is traveling at a high rate of speed the air from the motor 10 is of too high a pressure to be supplied to the tanks 2 and by the provision of the perforated nipple 32 and the cap 34 the pressure from the pump to the main supply pipe 11 may be reduced The trap 31 also provides an additional means for preventing the oil from the pump 10 from entering into the water in the tanks 2 and upon removal of the cap 34 of the nipple 32 the trap 31 may be drained of any oil that may settle therein.

In a device of this character, when live fish are kept for the purpose of food, it is very essential that the reservoir 21 and the trap 31 be provided for preventing the oil from being carried into the water in the tanks with the air and thus polluting the water.

What is claimed, is:

In a device of the class described, a fluid tank, an air pump, a pipe connection between said air pump and tank for supplying air pressure thereto, a reservoir in said pipe connection, an automatic pump oiling means connected to the reservoir and completing, together with a section of said pipe connection, an oil circulation to prevent oil from being carried into the tank, an auxiliary means between said tank and reservoir for trapping the oil carried in the air pressure from the reservoir, and means for regulating the air pressure throughout the system and providing an outlet for said auxiliary trapping means.

Signed at New York city, in the county of New York and State of New York, this 20th day of August, A. D. 1914.

MAX WENIG.

Witnesses:
JOSEPH HELD,
E. R. WATTES.